J. W. GAMBLE.
CULTIVATOR ATTACHMENT.
APPLICATION FILED AUG. 20, 1908.
1,079,938.
Patented Dec. 2, 1913.
4 SHEETS—SHEET 1.
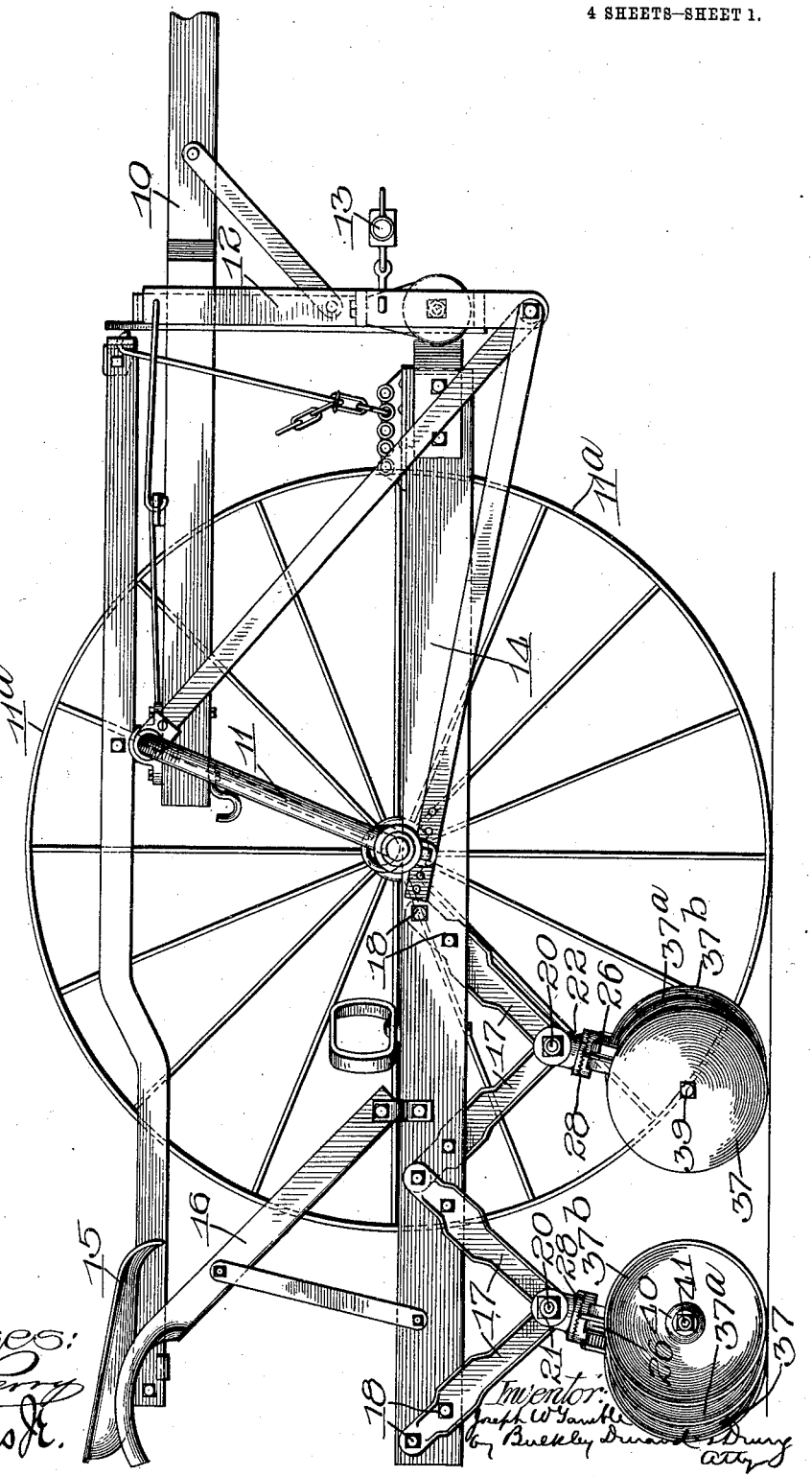

J. W. GAMBLE.
CULTIVATOR ATTACHMENT.
APPLICATION FILED AUG. 20, 1908.
1,079,938.
Patented Dec. 2, 1913.
4 SHEETS—SHEET 2.
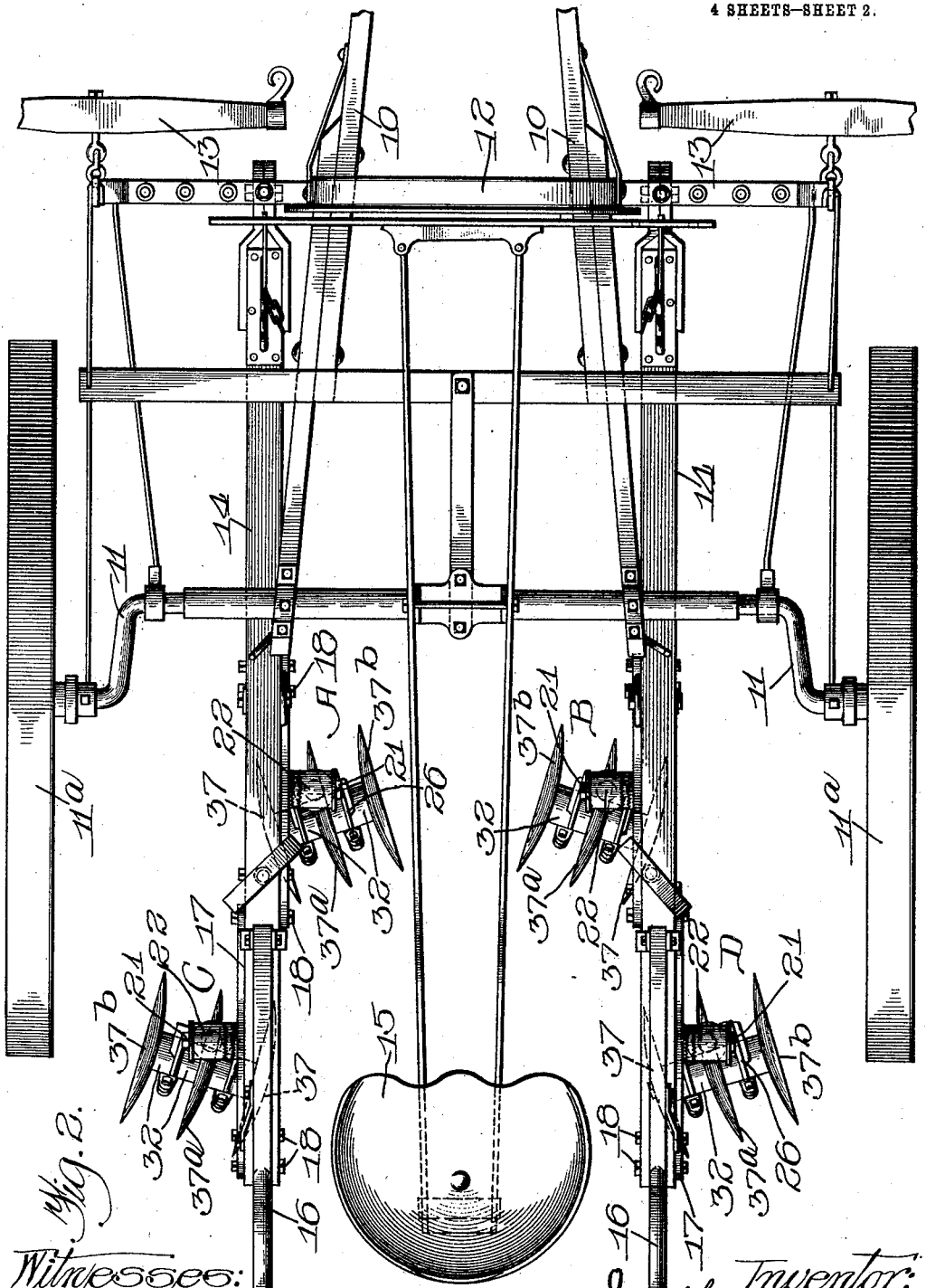

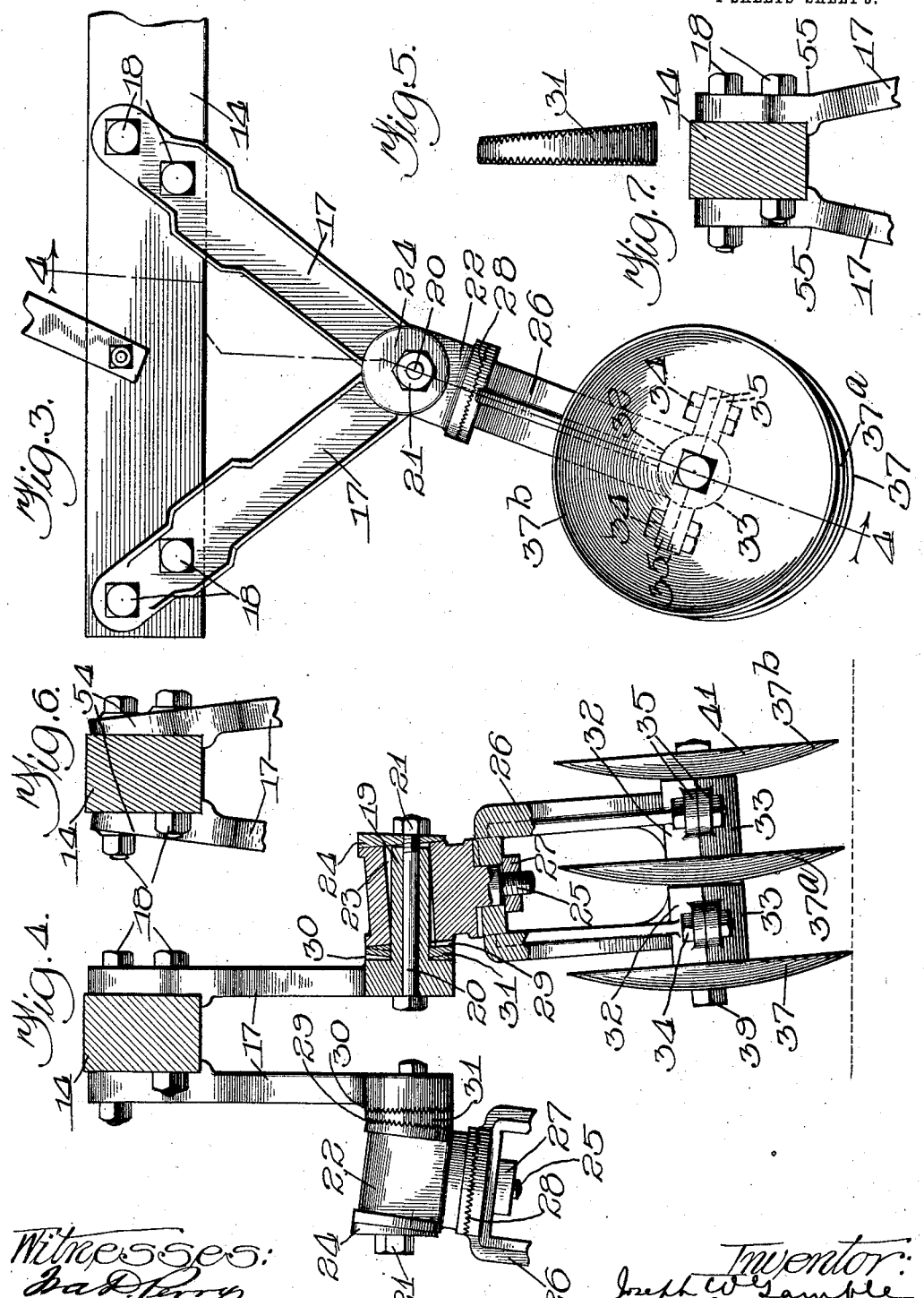

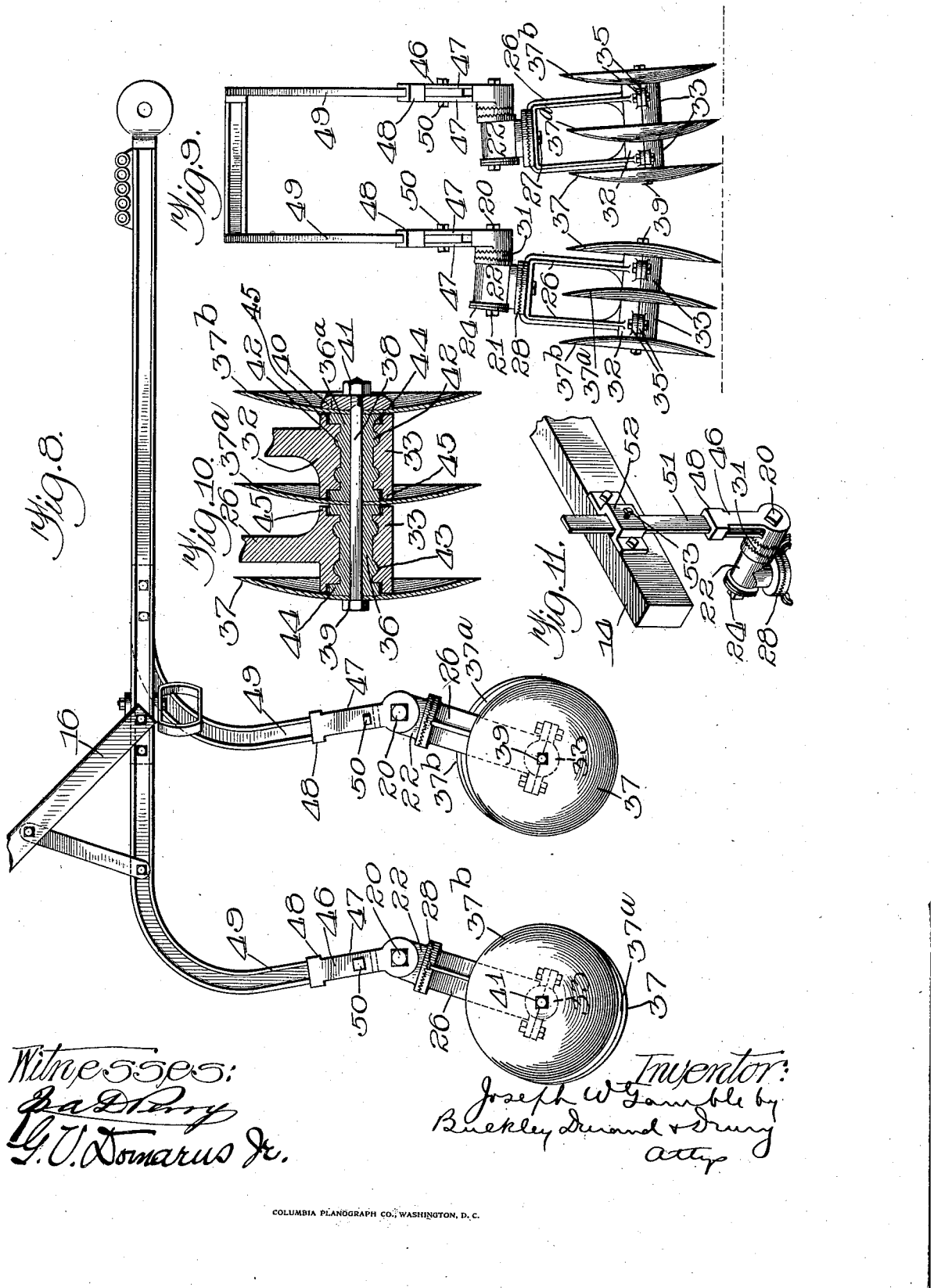

UNITED STATES PATENT OFFICE.

JOSEPH W. GAMBLE, OF CARPENTERSVILLE, ILLINOIS.

CULTIVATOR ATTACHMENT.

1,079,938. Specification of Letters Patent. Patented Dec. 2, 1913.

Application filed August 20, 1908. Serial No. 449,417.

*To all whom it may concern:*

Be it known that I, JOSEPH W. GAMBLE, a citizen of the United States of America, and resident of Carpentersville, Kane county, Illinois, have invented a certain new and useful Improvement in Cultivator Attachments, of which the following is a specification.

My invention relates to improvements in cultivator attachments, and has for its object the production of a machine in which the cultivating is done by disks and in which said disks are arranged in gangs and are so adjusted that all of the disks are held to their work without side thrust and are also so adjusted that each of the disks penetrate the ground to the same depth.

A further object is the production of a device that can be readily placed on existing machines of any type with slight, if any, changes in the original machine, and one in which the adjustment of the position of the disks may be readily and quickly made.

These and such other objects as may hereinafter appear are attained by my device, embodiments of which are illustrated in the accompanying drawings, in which:—

Figure 1 represents a side elevation of my improved machine. Fig. 2 represents a top plan view of Fig. 1. Fig. 3 represents an enlarged side elevation of a gang and attaching member. Fig. 4 represents a sectional view on the line 4—4 in Fig. 3, looking in the direction indicated by the arrows. Fig. 5 represents a side elevation of the adjusting collar. Fig. 6 represents a modified form of a part of Fig. 4. Fig. 7 represents a second modification of Fig. 4. Fig. 8 represents a side elevation of my device as adapted to an iron beam. Fig. 9 represents a rear view of Fig. 8. Fig. 10 represents an enlarged vertical sectional view through the center of one of the gangs. Fig. 11 represents a perspective view showing the method of attaching my device to a wooden beam.

Like numerals of reference indicate like parts in the several figures of the drawing.

Referring now to the drawing, 10 represents the frame of a cultivator seated on the axle 11. A supporting yoke bar 12 is seated on the front of the frame, to the extended lower ends of which are secured the swingle trees 13 and the beams 14. The wheels 11ª are mounted on the axle 11, and a seat 15 is mounted on the frame and axle, and handles 16 are secured to the beam 14 by means of which the gangs may be raised and lowered, as desired.

In my device the ordinary cultivator shovels are dispensed with, and the entire cultivation is performed with disks.

Referring now more particularly to Figs. 3 and 4, a V-shaped hanger or support 17 is secured to the beam by means of bolts 18. The apex of this point or bracket is provided with a bearing lug 19 extending at right angles thereto, through which passes the bolt 20, held in place by a nut 21. A gang yoke head 22 is provided with an opening 23 adapted to fit over the lug 19 and held in place by a cap 24 against which the nut 21 screws. This head terminates in a threaded end or bolt 25 adapted to pass through an opening in the top of the gang yoke 26, a nut 27 holding the yoke rigidly in place, the under face of the head surrounding the bolt 25, and the upper face of the yoke is serrated, as shown at 28. The inside face of the head and the outside face of the supporting lug are also serrated, as shown at 29—30, and a serrated collar 31, thicker on one side than the other, is fitted on the supporting lug between the gang yoke head and the face of the support. The cap 24 is of the same shape as the collar 31—that is, the opposite faces of the collar and head are not parallel. It is therefore apparent that by changing the relative position of the collar and head—that is, by revolving them about the lug—the position of the yoke 26 may be varied or inclined from the vertical, as shown in Fig. 4.

Referring now more particularly to Figs. 4 and 8, the ends of the yoke or fork 26 terminate in castings 32, to which are bolted lower castings 33 by means of bolts 34 passing through ears 35 on the castings. These castings form a journal box within which are seated the journals 36—36ª. The disks or pulverizers 37—37ª—37ᵇ are seated on a bolt 38 passing through the journal 36, the head 39 of the bolt pressing against the outside of the disk 37. A bearing washer 40 is mounted on the other end of the bolt 38 and fits against the inside of the disk 37ᵇ and a nut 41 screws against the washer clamping the disk 37ᵇ against the outer face of the journal 36ª. The disk 37ª is clamped between the outer face of the journal 36 and the inner face of the journal 36ª. The journals 36—36ᵃ are provided with annular ridges or bosses 42, and the inner face of the journal boxes 32—33 is provided with circumferential grooves 43 registering therewith, thus holding the disks against lateral movement. The journals are also preferably provided with annular flanges 44 on each end, and the members forming the journal boxes are provided with horizontal annular flanges 45 adapted to fit snugly against the adjacent faces of the disks and the faces of the flanges 44, thus preventing the admission of dust to the journal box and bearing.

In the modification shown in Figs. 8 and 9, the forks of the hanger are dispensed with and the lug 19 provided with a slotted upright 46 comprising parallel bars 47 and an apertured end or collar 48. The end of the metal beam 49 sliding through the aperture in the collar 46 and between the bars 47, is held adjustably in place by means of a bolt 50.

In Fig. 11, I show a simple method of attaching my device to a wooden beam in which an extension bar 51 slides within a bracket 52 secured to the beam, and is held in place within the bracket by means of a set screw 53.

In the modification shown in Fig. 6, the upper end of the bracket 17 is tapered at 54, throwing the bracket inwardly and accomplishing the same result so far as the vertical positions of the disks are concerned, while in the modification shown in Fig. 7 the same result is obtained by bending the bracket at 55.

Referring now to Fig. 2, let the forward gangs be designated by the letters A—B, and the rear gangs by the letters C—D. When the implement is used for cultivating corn, for example, the rider straddles the row and the disks of gangs A—B are set to cultivate the soil and throw it toward the corn, while the disks of gangs C—D are turned to throw up the soil in the opposite direction.

It will thus be seen that by the use of oppositely disposed disks or gangs on the same support or beam, each may be set to counteract the side thrust or draft of the other, thus rendering it unnecessary to use any appreciable amount of force in guiding them, and at the same time dispensing with any yoke or tie between the supports or beams. At times it may be necessary to incline the gangs at varying angles with respect to the support or beam, but even then the only power needed will be that necessary to overcome the difference in strain between the opposite gangs. In most cases the driver sitting with his feet in the stirrups can guide the machine without touching the handles.

Referring now to the adjustment and the operation of the disks, let us consider the gang shown in Fig. 4 as representing D in Fig. 2. The outer disk being forced to do the greater work is consequently driven deeper into the soil, and the pressure of the soil against the disk tends to spring it backwardly. As these disks are held against individual displacement, this additional thrust against the outer disk throws in a measure the center and inside disk upwardly. This being the case, when the disks are set so that the edges are parallel with the ground, or so that they enter the ground at the same time when the machine is doing its work the greater part of the work is being done by the inside disk, the outside disk traveling much nearer the surface of the soil. This defect may be corrected by means of the form of brackets shown in Figs. 6 and 7, or by the use of the adjustable parts shown clearly in Fig. 4. The collar 31 and the cap 24 are adjusted throwing the yoke 26 and consequently the disks themselves out of vertical alinement, and as the disks are all of the same size, this change in the position of the yoke changes the position of the disks with relation to the ground. I find in practice if the yoke is inclined to such an extent that when the inner disk just touches the ground and the outer disk is less than half an inch above the ground, the best results are attained—that is, when the disks are working, the increased elevation of the outer disk counteracts the tendency of the central and inner disks to swing upwardly to the extent that the disks will all enter the ground about the same distance and each perform its required share of the work. The gangs may be swung on the bearing 19, when it is desired to vary the depth to which the disks shall enter the ground, it being often advisable to have one gang cultivate at a different depth than the other. This adjustment is readily and quickly made, and the fact that the opposite faces of the parts are serrated insures a rigidity of the parts and prevents any possible slipping. The yoke 26 being pivotally mounted on the end of the head 22 permits the swinging of the gang about in order to change the direction of the disks. This change in the direction is often necessitated by the conditions under which the cultivator is operated, and it is essential that this change may be readily and quickly made, at the same time the fact that the contiguous surfaces of the head and yoke are serrated also insures a certain amount of rigidity to the structure and lessens the liability of disarrangement of parts regardless of the strain to which they are subjected.

By the use of my device I find that the ordinary cultivator shovels may be dispensed with, and proper cultivation attained by the use of the disks, or pulverizers in a substantially disk form, the proper adjustability of which is fully cared for by the means shown in the accompanying drawings, and fully described in the specifications heretofore.

I claim:

1. A cultivator comprising pivotal longitudinal beams and two gangs of disks adjustably and detachably mounted on each beam one in front of the other and facing in opposite directions.

2. In a cultivator, a pivotal beam, gangs of disks, two of which are mounted on said beam, one in advance of the other on opposite sides of the beam, and facing in opposite directions.

3. In a cultivator, a pivotal beam, gangs of disks, two of which are adjustably and detachably secured to opposite sides of the beam, said gangs having non-coincident axes and facing in opposite directions.

4. In a disk cultivator, longitudinal beams pivotally mounted on opposite sides of the center line of said cultivator, gangs of disks mounted on said beams, one on each side of each beam, said gangs facing in opposite directions on each side of the row being cultivated.

5. In a cultivator, a frame, a beam mounted on said frame, a suitable hanger extending downwardly from said beam, a bearing lug on the lower end of said hanger, a gang yoke head adapted to be supported on said bearing lug and a disk gang suspended from said yoke head, a collar thicker on one side than on the other, on said lug and bearing against said yoke head whereby said gangs may be inclined to the vertical by a rotation of said collar.

Signed by me at Carpentersville, Illinois, this 15th day of August, 1908.

JOSEPH W. GAMBLE.

Witnesses:
EDWARD C. MASTERS,
GEORGE E. WILBERN.

Copies of this patent may be obtained for five cents each, by addressing the "Commissioner of Patents, Washington, D. C."